(12) United States Patent
Prakash et al.

(10) Patent No.: US 7,990,998 B2
(45) Date of Patent: Aug. 2, 2011

(54) CONNECTION SETUP USING FLEXIBLE PROTOCOL CONFIGURATION

(75) Inventors: Rajat Prakash, San Diego, CA (US);
Gavin Bernard Horn, La Jolla, CA (US); Nikhil Jain, San Diego, CA (US); Ramin Rezaiifar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 838 days.

(21) Appl. No.: 11/087,187

(22) Filed: Mar. 22, 2005

(65) Prior Publication Data
US 2006/0133409 A1 Jun. 22, 2006

Related U.S. Application Data

(60) Provisional application No. 60/638,471, filed on Dec. 22, 2004.

(51) Int. Cl.
H04L 12/42 (2006.01)
(52) U.S. Cl. .......................................... 370/450; 455/436
(58) Field of Classification Search .................. 370/254, 370/395.2, 320, 441, 335
See application file for complete search history.

(56) References Cited

U.S. PATENT DOCUMENTS

| | | | | |
|---|---|---|---|---|
| 4,955,021 A * | 9/1990 | Wei | ............................... | 370/401 |
| 5,878,142 A * | 3/1999 | Caputo et al. | .................. | 713/159 |
| 6,061,563 A * | 5/2000 | Lee | ............................... | 455/436 |
| 6,075,797 A * | 6/2000 | Thomas | ......................... | 370/310 |
| 6,195,564 B1 * | 2/2001 | Rydbeck et al. | .............. | 370/335 |
| 6,370,380 B1 * | 4/2002 | Norefors et al. | .............. | 370/331 |
| 6,385,653 B1 * | 5/2002 | Sitaraman et al. | ............ | 709/203 |
| 6,493,430 B2 | 12/2002 | Leuca et al. | | |
| 6,535,918 B1 * | 3/2003 | Bender et al. | ................. | 709/228 |
| 6,587,680 B1 * | 7/2003 | Ala-Laurila et al. | .......... | 455/411 |

(Continued)

FOREIGN PATENT DOCUMENTS

JP 2003319430 11/2003

(Continued)

OTHER PUBLICATIONS

CDMA2000 High Rate Packet Data Air Interface Specification, Oct. 27, 2000, 3$^{rd}$ Generation Partnership Project 2 "3GPP2".*

(Continued)

Primary Examiner — Ricky Ngo
Assistant Examiner — Phuongchau B Nguyen
(74) Attorney, Agent, or Firm — Milan Patel; Darren M. Simon

(57) ABSTRACT

A user terminal establishes a session with a first access point (AP0) and obtains a token associated with modem configuration information used for radio communication. The user terminal thereafter establishes a connection with a second access point (AP1) by sending the token. AP1 receives the token, obtains the modem configuration information associated with the token, and initializes an air interface protocol stack with the modem configuration information to obtain a modem-specific protocol stack for the user terminal. AP1 sends a response indicating successful connection setup. The user terminal and AP1 thereafter communicate in accordance with the modem-specific protocol stack. AP1 may attempt to fetch the session for the user terminal from AP0. If this is successful, then AP1 updates the protocol stack with the session information to obtain a complete protocol stack for the user terminal. The user terminal and AP1 thereafter communicate with the complete protocol stack.

35 Claims, 10 Drawing Sheets

U.S. PATENT DOCUMENTS

| | | | |
|---|---|---|---|
| 6,725,278 B1* | 4/2004 | Gonzalez | 709/217 |
| 6,772,331 B1* | 8/2004 | Hind et al. | 370/313 |
| 6,785,556 B2* | 8/2004 | Souissi | 379/93.29 |
| 6,813,238 B1* | 11/2004 | Otani et al. | 370/216 |
| 6,851,050 B2 | 2/2005 | Singhal et al. | |
| 6,985,757 B2* | 1/2006 | Liu et al. | 375/222 |
| 7,039,021 B1* | 5/2006 | Kokudo | 370/310 |
| 7,103,359 B1* | 9/2006 | Heinonen et al. | 370/331 |
| 7,174,456 B1* | 2/2007 | Henry et al. | 713/158 |
| 7,185,196 B1* | 2/2007 | Kuskin et al. | 713/162 |
| 7,188,159 B2* | 3/2007 | Ralston et al. | 709/220 |
| 7,313,384 B1* | 12/2007 | Meenan et al. | 455/410 |
| 7,355,994 B2* | 4/2008 | Shpak | 370/320 |
| 7,359,339 B2* | 4/2008 | Benson et al. | 370/329 |
| 7,373,508 B1* | 5/2008 | Meier et al. | 713/168 |
| 7,577,425 B2* | 8/2009 | Okazaki et al. | 455/436 |
| 7,607,015 B2 | 10/2009 | Fascenda | |
| 2002/0032855 A1* | 3/2002 | Neves et al. | 713/154 |
| 2002/0097707 A1 | 7/2002 | Balazinski et al. | |
| 2002/0101913 A1* | 8/2002 | Masters et al. | 375/219 |
| 2002/0110230 A1* | 8/2002 | Leuca et al. | 379/201.01 |
| 2002/0193110 A1 | 12/2002 | Julka et al. | |
| 2002/0196749 A1 | 12/2002 | Eyuboglu et al. | |
| 2003/0028763 A1* | 2/2003 | Malinen et al. | 713/155 |
| 2003/0055990 A1* | 3/2003 | Cheline et al. | 709/229 |
| 2003/0074430 A1* | 4/2003 | Gieseke et al. | 709/221 |
| 2003/0115460 A1* | 6/2003 | Arai | 713/168 |
| 2003/0135626 A1 | 7/2003 | Ray et al. | |
| 2003/0145119 A1* | 7/2003 | Bender et al. | 709/249 |
| 2003/0166397 A1* | 9/2003 | Aura | 455/410 |
| 2004/0014422 A1* | 1/2004 | Kallio | 455/41.1 |
| 2004/0068653 A1* | 4/2004 | Fascenda | 713/168 |
| 2004/0242197 A1* | 12/2004 | Fontaine | 455/411 |
| 2005/0086524 A1* | 4/2005 | Cavanaugh | 713/201 |
| 2005/0135625 A1* | 6/2005 | Tanizawa et al. | 380/270 |
| 2005/0201564 A1* | 9/2005 | Kayashima et al. | 713/171 |
| 2005/0262247 A1* | 11/2005 | Whitehead | 709/227 |

FOREIGN PATENT DOCUMENTS

| | | |
|---|---|---|
| WO | WO 03/024128 | 3/2003 |
| WO | WO 03/088617 | 10/2003 |

OTHER PUBLICATIONS

Critical Elements of testing Wireless Mobile IP, Feb. 2004, Sirent Communications.*

International Search Report and Written Opinion—PCT/US2005/047644, International Search Authority—European Patent Office—May 19, 2006.

* cited by examiner

CONNECTION SETUP USING FLEXIBLE PROTOCOL CONFIGURATION

CLAIM OF PRIORITY UNDER 35 U.S.C. §119

The present Application for Patent claims priority to Provisional Application No. 60/638,471 entitled "Connection Setup Using Flexible Protocol Configuration CDMA" filed Dec. 22, 2004, and assigned to the assignee hereof and hereby expressly incorporated by reference herein.

BACKGROUND

I. Field

The present invention relates generally to communication, and more specifically to techniques for setting up a connection in a communication system.

II. Background

In a communication system, a user terminal communicates with an access point in order to obtain various services such as voice, packet data, and so on. A session is typically established for the user terminal to facilitate communication. As part of the session establishment, the user terminal and the access point may negotiate for various configurable protocols and select parameters for these protocols. A session is often considered as a collection of information for protocols, security keys, user capabilities, and so on, which is to be used for communication between the user terminal and the access point. Hence, the terms "session" and "session information" are often used interchangeably.

For proper operation, the configured protocols need to be synchronized at the user terminal and the session-holding access point, which is the access point currently holding the session for the user terminal. The user terminal may be mobile and, while in a power save mode, may have moved from the coverage area of the session-holding access point into the coverage area of a new access point. If the user terminal thereafter enters an active mode (e.g., due to a user-initiated call or a page from the system) while under the coverage of the new access point, then the user terminal may attempt to communicate with the new access point. However, the new access point typically does not know the configured protocols used by the user terminal. Communication with the new access point typically commences only after the session for the user terminal has been retrieved from the session-holding access point or a new session has been established with the new access point.

The new access point may obtain the session previously established for the user terminal in several ways. In one method, the user terminal provides the new access point with the address of the session-holding access point. The new access point then fetches the session from the session-holding access point. In another method, the user terminal sends the entire list of configured protocols (or parameters that are set to non-default values) to the new access point. The new access point then sets up the appropriate protocols based on the information received from the user terminal. For both methods, a delay is incurred to either fetch the session from the session-holding access point or receive the session information from the user terminal. Furthermore, system resources are expended to send the session information from either the session-holding access point or the user terminal to the new access point.

There is therefore a need in the art for techniques to efficiently set up a connection between a user terminal and an access point.

SUMMARY

Techniques for performing connection setup using flexible protocol configuration are described herein. Session information for a user terminal is partitioned into multiple categories, for example, two categories called user-specific session information and modem configuration information. The user-specific session information includes information that is specific to the user terminal such as, e.g., security keys and address information. The modem configuration information includes information used for radio connectivity.

A limited number of modem-specific configurations may be defined and made available for use in a communication network. Each modem-specific configuration is associated with specific modem configuration information that indicates (1) the protocol versions to use for various layers of an air interface protocol stack and (2) the parameter values for these versions of protocols. Each allowed modem-specific configuration is assigned a different token that uniquely identifies that modem-specific configuration.

A user terminal initially establishes a session with a first access point and obtains at least one token associated with its modem configuration information. Thereafter, the user terminal may establish a connection with a second access point by sending a token instead of the modem configuration information. The second access point receives the token sent by the user terminal and obtains the modem configuration information associated with this token. The second access point then initializes an air interface protocol stack with the modem configuration information and obtains a modem-specific protocol stack for the user terminal. The second access point then sends a response back to the user terminal to indicate successful connection setup. The user terminal and the second access point thereafter communicate in accordance with the modem-specific protocol stack for the user terminal. The second access point may allow the user terminal access to certain limited functionality until the session for the user terminal is retrieved.

The second access point may attempt to fetch the session for the user terminal from the first access point. If this is successful, then the second access point updates the protocol stack with the fetched session information to obtain a complete protocol stack for the user terminal. The user terminal and the second access point thereafter communicate with the complete protocol stack, e.g., exchange secured data using the security keys.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
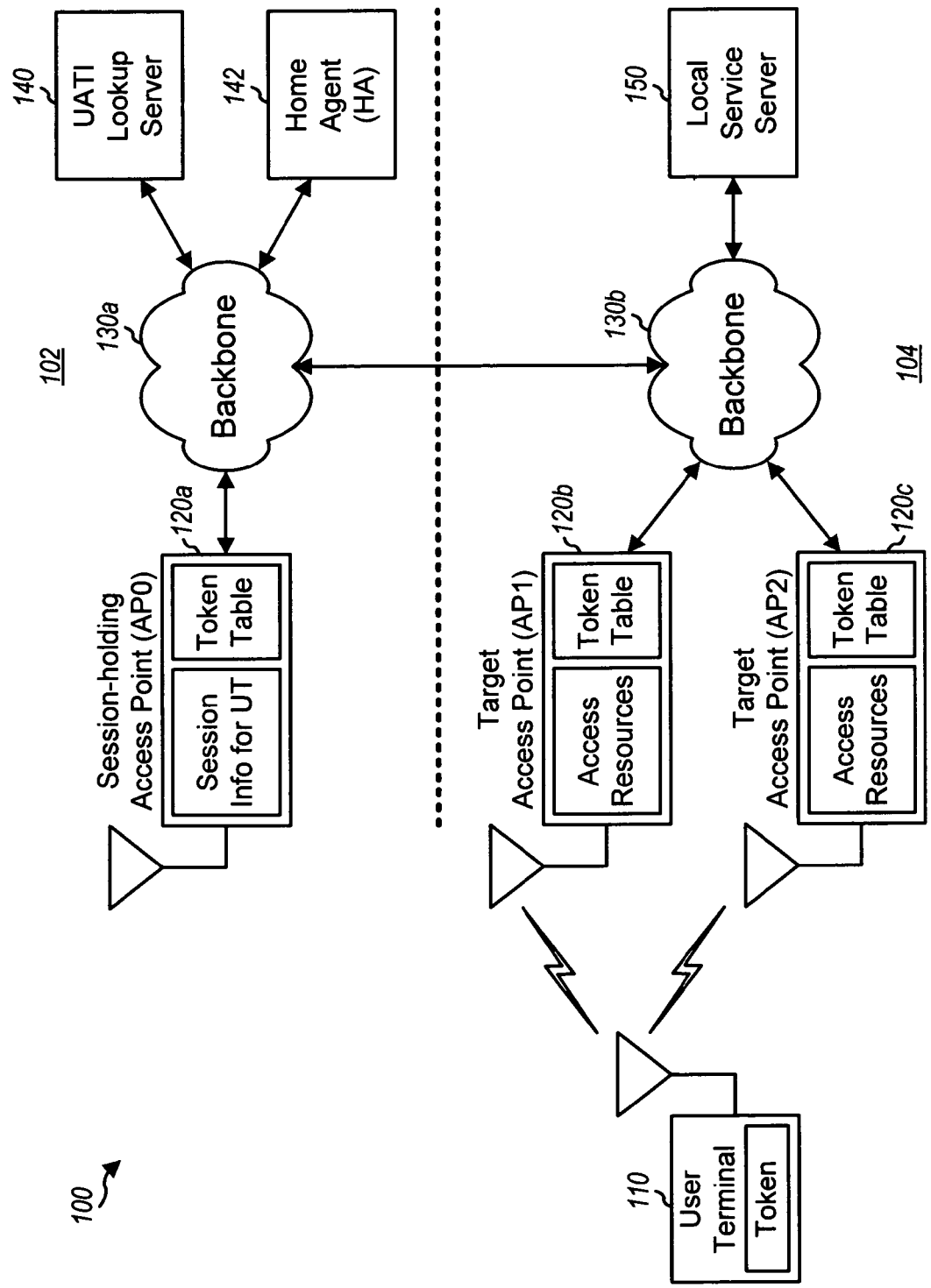
FIG. 1 shows a wireless communication network.

FIG. 1 shows a wireless communication network 100 with a number of access points that support communication for a number of user terminals. For simplicity, only one user terminal 110 and three access points 120a (AP0), 120b (AP1), and 120c (AP2) are shown in FIG. 1. An access point is typically a fixed station that is used for communicating with the user terminals and may also be called a base station, a base transceiver system (BTS), a node B, or some other terminology. A user terminal (UT) may be fixed or mobile and may also be called an access terminal (AT), a mobile station (MS), a user equipment (UE), a wireless device, a handset, or some other terminology. A user terminal may communicate with one or multiple access points on the forward link and/or reverse link at any given moment. The forward link (or downlink) refers to the communication link from the access points to the user terminals, and the reverse link (or uplink) refers to the communication link from the user terminals to the access points.

As noted above, a session is a collection of information for the user terminal such as security keys, protocols and/or protocol versions, protocol states, user capabilities, and so on. A session is typically long lived. A connection is a radio data path that is typically established as needed for communication and is closed thereafter. A connection is typically short lived.

For a non-hierarchical architecture shown in FIG. 1, user terminal 110 has previously established a session (which may be via any access point in the system), and access point 120a currently holds the session for user terminal 110. For a hierarchical architecture, a central network entity holds the session for the user terminal, and access point 120a knows the contents of this session. For clarity, the following description is for the non-hierarchical architecture. User terminal 110 is mobile and has moved from the coverage of access point 120a into the coverage of access points 120b and 120c. Access point 120a is located in geographic area 102, and access points 120b and 120c are located in a different geographic area 104. User terminal 110 may attempt to establish a connection with access point 120b and/or 120c for communication.

For clarity, the following terms are used in the following description. A session-holding access point is an access point holding a session for a user terminal, which may or may not be the access point with which the user terminal has originally established the session since the session may be transferred from one access point to another. A "target" access point is an access point with which the terminal attempts to establish a connection. An "anchor" access point is an access point that manages the connection and active set for the user terminal. A "serving" access point is an access point that currently serves the connection for the user terminal. The target access point typically becomes both the serving and anchor access points for the user terminal after completion of connection setup.

A backbone 130a interconnects access point 120a, a universal access terminal identifier (UATI) lookup server 140, and a home agent (HA) 142 in geographic area 102. A UATI is a unique identifier assigned to each user terminal and is used to uniquely identify the user terminal. UATI lookup server 140 stores a list of user terminals (e.g., indexed by their UATIs) that have opened sessions in the system. UATI lookup server 140 may be accessed to ascertain the session-holding access point for any user terminal in the system (consisting of geographic areas 102 and 104 for the example in FIG. 1). Home agent 142 provides data connectivity for user terminals with opened sessions in the system (consisting of geographic areas 102 and 104).

A backbone 130b interconnects access points 120b and 120c and a local service server 150. Local service server 150 may provide services such as, e.g., 911 emergency service, web access, push-to-talk (PTT), voice over Internet Protocol (VoIP), and so on. The techniques described here allow for quick and reliable access to local service server 150, irrespective of the state of backbone 130b. Such quick and reliable access is particularly important for 911 and other emergency services.

Figure 2:
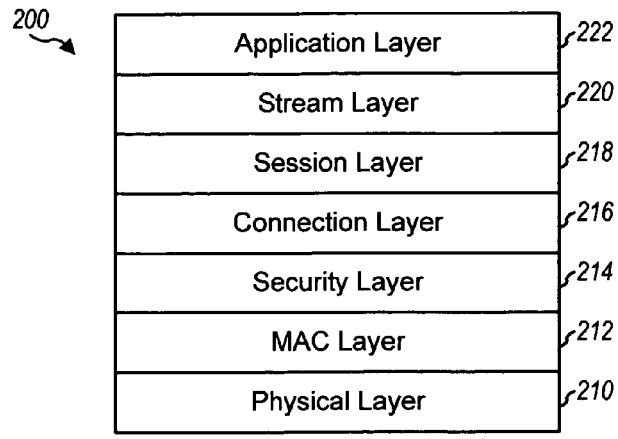
FIG. 2 shows an exemplary air interface protocol stack.

FIG. 2 shows an exemplary air interface protocol stack 200 that may be used for radio communication between user terminal 110 and any access point 120. Protocol stack 200 is different from the Open Systems Interconnection (OSI) protocol stack. For the embodiment shown in FIG. 2, protocol stack 200 includes seven layers: a physical layer 210, a Medium Access Control (MAC) layer 212, a security layer 214, a connection layer 216, a session layer 218, a stream layer 220, and an application layer 222.

Physical layer 210 defines the physical characteristics of the transmission between the user terminal and the access point. These physical characteristics may include, for example, the channel structure, the transmission frequency, the output transmit power level, the coding scheme, the modulation format, and so on, for the forward and reverse links. MAC layer 212 defines the procedures used to transmit, receive and process data over physical layer 210. Security layer 214 provides secured services such as, for example, authentication and encryption services. Connection layer 216 provides radio connection establishment and maintenance services. Session layer 218 provides layer and protocol negotiation, protocol configuration, and state maintenance services. Stream layer 220 provides multiplexing of various application streams. Application layer 222 supports applications such as, for example, a signaling application that sends air-interface protocol messages, a packet data application that sends user traffic data, a radio link protocol (RLP) that provides data retransmission capability to improve reliability, and so on. Protocol stack 200 may be implemented in various manners. An exemplary implementation of protocol stack 200 is described in 3GPP2 C.S0024, entitled "cdma2000 High Rate Packet Data Air Interface Specification," version 2.0, Oct. 27, 2000.

A session typically includes many parameters for various protocols in protocol stack 200. The session may also include additional configuration parameters that are not a part of protocol stack 200. The layers described above for protocol stack 200 are generally relevant for air interface compatibility between the user terminal and the access point.

Each layer in protocol stack 200 utilizes various protocols to achieve the designed functionality. For example, the MAC layer may utilize a hybrid automatic repeat request (HARQ) protocol to incrementally transmit each data packet. The security layer may utilize separate encryption and authentication protocols. The connection layer may utilize an active set protocol to manage a set of access points with which the user terminal can communicate. There may be multiple versions or subtypes of a given protocol. Each protocol may also have various configurable parameters. The protocols within the same layer as well as the protocols in different layers may be configured independently. A user terminal may communicate with an access point using only a subset of all of the protocols for the seven layers. The protocols used for communication typically need to be synchronized at the user terminal and the access point. Each protocol communicates peer-to-peer. Some protocols can communicate only if the protocol state is synchronized so that the same protocol version and configurable parameter values are used by both the user terminal and the access point. Other protocols can communicate with parameter values that are not the same at the transmitter and receiver, albeit typically with some degradation in performance. For example, a protocol at the transmitter may think that RLP NAKs are disabled and a peer protocol at the receiver may think that RLP NAKs are enabled, in which case the transmitter will not send NAKs and the quality of service may be degraded.

The session information for a given user terminal includes all pertinent information for the protocols and parameter values to use for communication. The session information may be partitioned into multiple categories or parts. In an embodiment, the session information is partitioned into two categories called user-specific session information and modem configuration information.

The user-specific session information may include the following:

1. Security keys—used by the security layer for encryption and authorization.
2. RLP flow parameters—determine whether negative acknowledgments (NAKs) are sent for each RLP flow and other attributes of the RLP.
3. Quality of Service (QoS) information—determines multiplexing and transmission of data, e.g., mapping of Internet Protocol (IP) ports to RLP flows (which are data flows at the RLP).
4. Token bucket regulator states—used for fairness consideration.
5. Addressing information—the UATI or some other address for the user terminal.
6. Paging cycle and offset—indicates when paging messages may be sent to the user terminal.

The modem configuration information may include the following:

1. Protocol versions of all protocols used for radio communication.
2. Pilot add/drop thresholds—determine the pilot strength levels at which a new access point should be added or a current access point should be dropped from a candidate set maintained by the user terminal.
3. Access class—determines the priority of the user terminal while making access attempts.
4. Control channel signaling scheme—determines interpretation of bits sent on control channels (e.g., power control bits, channel quality report bits).
5. Other air-interface information that is not user-specific.

The above are examples of some types of information for the user-specific session information and the modem configuration information. These examples are given for illustrative purposes. In general, the user-specific session information includes information that is not necessary for establishing a stable radio connection, and the modem configuration information includes information that is pertinent for radio communication. The types of information to be included in each category are typically dependent on the network design.

In general, the session information may be partitioned into any number of categories, and each category may cover any type of information. A given configurable parameter may appear in multiple categories. For example, the modem configuration information may include a default value for a parameter (which may be suitable for radio communication but may be sub-optimal) and the user-specific session information may include another (more optimal) value for this same parameter. The session information would then include both parameter values, which are partitioned into different categories. For simplicity, much of the following description assumes the use of the two categories noted above.

The modem configuration information has the following characteristics. First, the modem configuration information for a given session is the same at the user terminal and the network. If the user terminal and the network use different values for any parameter, then the behavior may be unpredictable. Second, only certain combinations of modem configuration information are allowed by the network. Third, the modem specific configuration information alone is sufficient to enable basic communication between the user terminal and access point, and such communication may be important for quick and reliable communication with local service server 150.

A limited number of modem-specific configurations may be defined and made available for use in the network. Each modem-specific configuration is associated with specific modem configuration information that indicates (1) the protocol versions to use for various layers of the protocol stack and (2) the parameter values for these versions of protocols. The number of allowed modem-specific configurations may be a small subset of all of the possible modem-specific configurations. The number of allowed modem-specific configurations is sufficiently large to provide flexibility to serve a wide range of user terminals but is also sufficiently small for easy maintenance. Different modem-specific configurations may be used for different user terminals based on their hardware types, service agreements, and so on.

Each allowed modem-specific configuration may be assigned a different token that uniquely identifies that modem-specific configuration. A token is an N-bit value that represents a specific modem-specific configuration, where N is determined by the number of modem-specific configurations supported by the network. Table 1 lists four categories of modem-specific configurations, exemplary ranges of token values for 16-bit tokens for the four categories, and their short descriptions. In Table 1, 0x---- denotes a hexadecimal value defined by the four hexadecimal digits after the 'x'.

TABLE 1

| Modem-Specific Configuration | Token Value | Definition |
| --- | --- | --- |
| Default | 0x0000 | Default modem-specific configuration with default versions and parameters for all pertinent protocols. |
| Standardized | 0x0001-0x0FFF | Modem-specific configurations specified in an air-interface specification. |
| Preconfigured | 0x1000-0x7FFF | Modem-specific configurations preconfigured by the network and specified during session setup. |
| Non-preconfigured | 0x8000-0xFFFF | Modem-specific configurations that are not preconfigured. |

The default modem-specific configuration refers to an air interface protocol stack where default versions and default parameter values are used for all protocols. A standardized modem-specific configuration refers to an air interface protocol stack where the protocol versions and parameter values are specified in an air-interface specification. The standardized modem-specific configurations are supported by each spec-compliant access point. A preconfigured modem-specific configuration refers to an air interface protocol stack where the protocol versions and parameter values are specified for the network (e.g., by a network operator). All access points within the network are aware of the preconfigured modem-specific configurations and their associated tokens. A non-preconfigured modem-specific configuration refers to an air interface protocol stack that may not be recognized across the entire network. Different regions of the network may define different sets of non-preconfigured modem-specific configurations. The access points in each region would recognize the set of non-preconfigured modem-specific configurations allowed for that section.

Figure 3A:
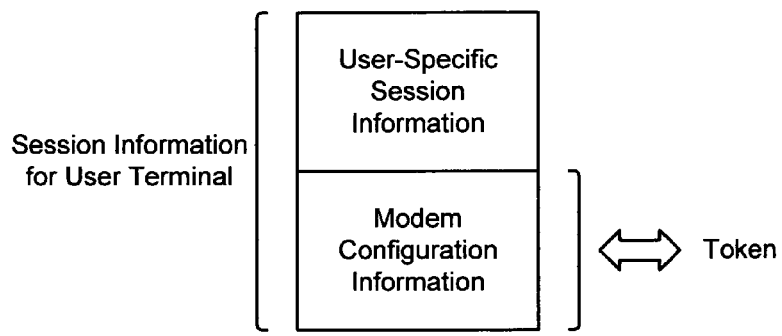
FIG. 3A illustrates the partitioning of the session information.

FIG. 3A illustrates the partitioning of the session information for user terminal 110 into user-specific session information and modem configuration information. The modem configuration information is associated with a unique token that conveniently and efficiently conveys this information with a single N-bit value.

As noted above, the session information may also be partitioned into more than two categories, and each category may be associated with a different set of tokens. For each category, each allowed combination of session information for that category is assigned a different token (from the token set for the category) that uniquely conveys that combination of session information. The ranges of token values given in Table 1 represent a specific embodiment, and other ranges of token values may also be used for the various categories.

Figure 3B:
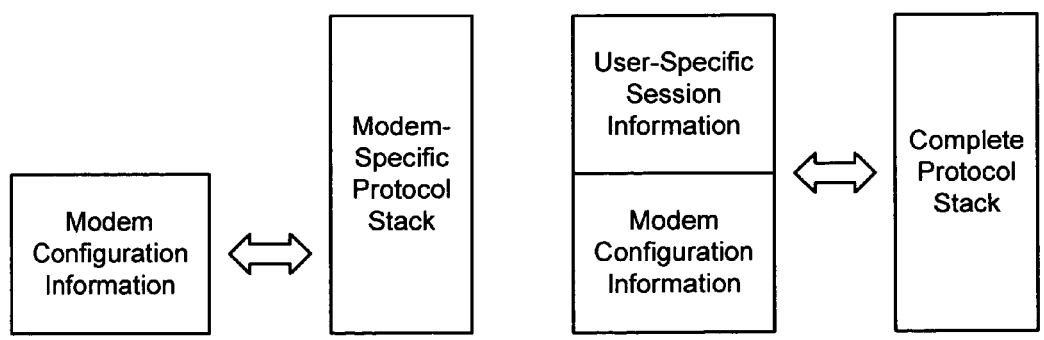
FIG. 3B shows protocol stacks used for a connection.

FIG. 3B shows protocol stacks used for a connection. A modem-specific protocol stack may be formed with the modem configuration information for a session and may be used to provide radio connectivity. A "complete" protocol stack may be obtained by updating the modem-specific protocol stack with user-specific session information. The modem-specific and complete protocol stacks provide different capabilities, as described below.

Referring back to FIG. 1, each access point 120 in network 100 may maintain a token table (as shown in FIG. 1) or may have access to the token table. The token table may include an entry for each allowed token, and each entry may contain all of the modem configuration information associated with that token. Each access point 120 may use the token table to obtain the modem configuration information for any allowed token.

Figure 4:
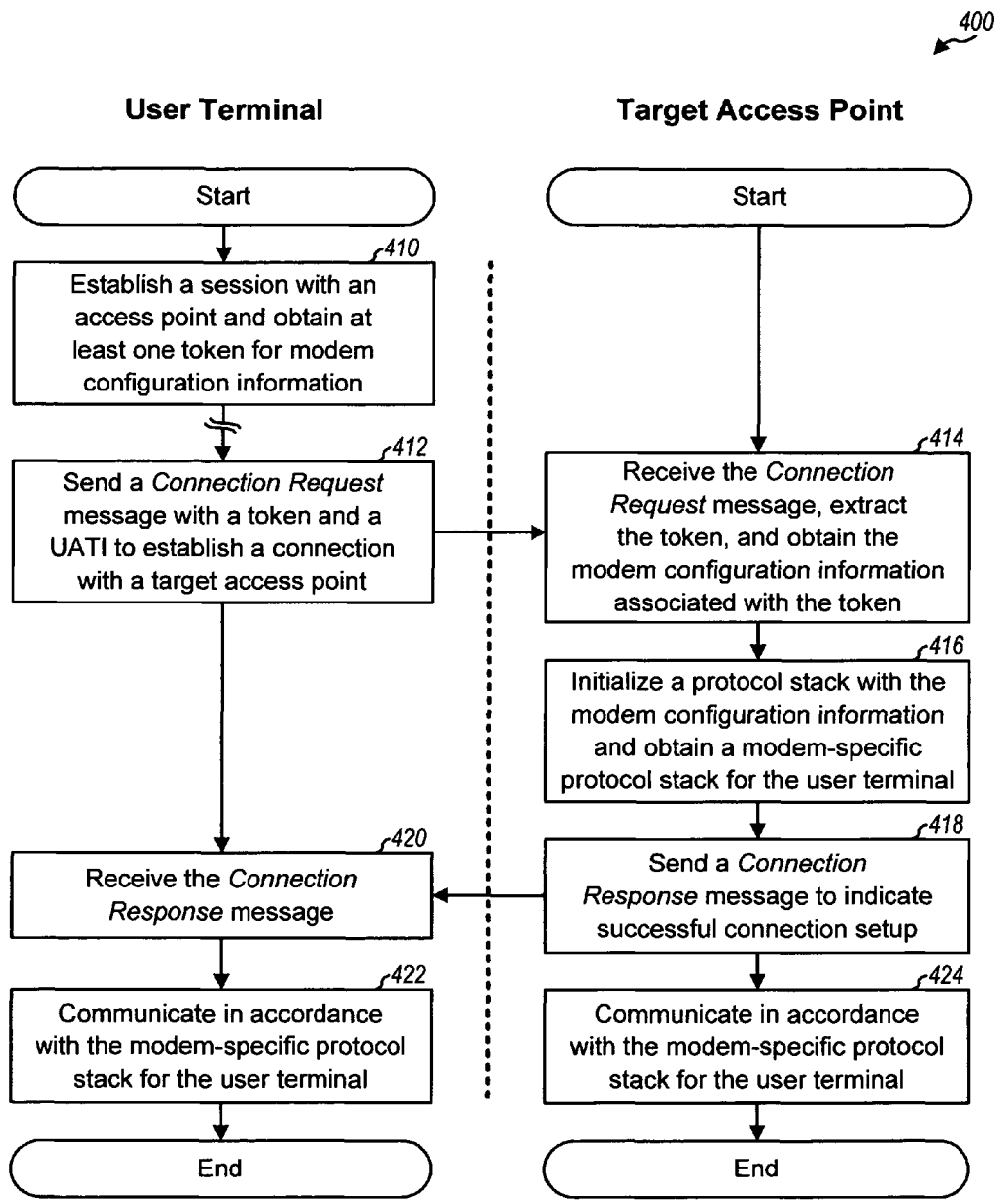
FIG. 4 shows a process for establishing a connection using a token.

FIG. 4 shows a process 400 for establishing a connection using a token. User terminal 110 initially establishes a session with access point 120a and obtains at least one token, where each token is associated with specific modem configuration information for the user terminal (block 410). For example, the user terminal may obtain multiple tokens for different types of applications (e.g., a token for making an emergency call, a token for obtaining data connectivity, and so on). As another example, in a user terminal may obtain multiple tokens for different protocol releases (e.g., a token for a current release, a token for a prior release, and so on). A token may be associated with just parameters needed to send signaling (e.g., for an emergency call). A token may also be associated with additional parameters that allow for exchange of data.

Thereafter, the user terminal attempts to establish a connection with target access point 120b by sending a Connection Request message containing the identifier of the user terminal and a token for pertinent modem configuration information (block 412). A message may also be called a packet, a capsule, or some other terminology. The user terminal identifier may be a UATI assigned to the user terminal, an access terminal identifier (ATI) containing the 32 least significant bits of the UATI, or some other type of identifier for the user terminal. The identifier may also be omitted from the Connection Request message and sent by the user terminal after access has been granted. The Connection Request message may also indicate that the user terminal does not want a session with the target access point.

The target access point receives the Connection Request message from the user terminal, extracts the token from the message, and obtains the modem configuration information associated with the token (e.g., using the token table) (block 414). The target access point initializes the air interface protocol stack with the modem configuration information associated with the token and obtains a modem-specific protocol stack for the user terminal (block 416). The target access point then sends back a Connection Response message to the user terminal to indicate successful connection setup (block 418). The user terminal receives the Connection Response message (block 420). The user terminal and the target access point thereafter communicate in accordance with the modem-specific protocol stack for the user terminal (blocks 422 and 424).

FIG. 4 shows a scenario in which the user terminal sends a valid token and the target access point is not the session-holding access point for the user terminal. The connection setup may proceed in different manners depending on the information available at the target access point.

Figure 5:
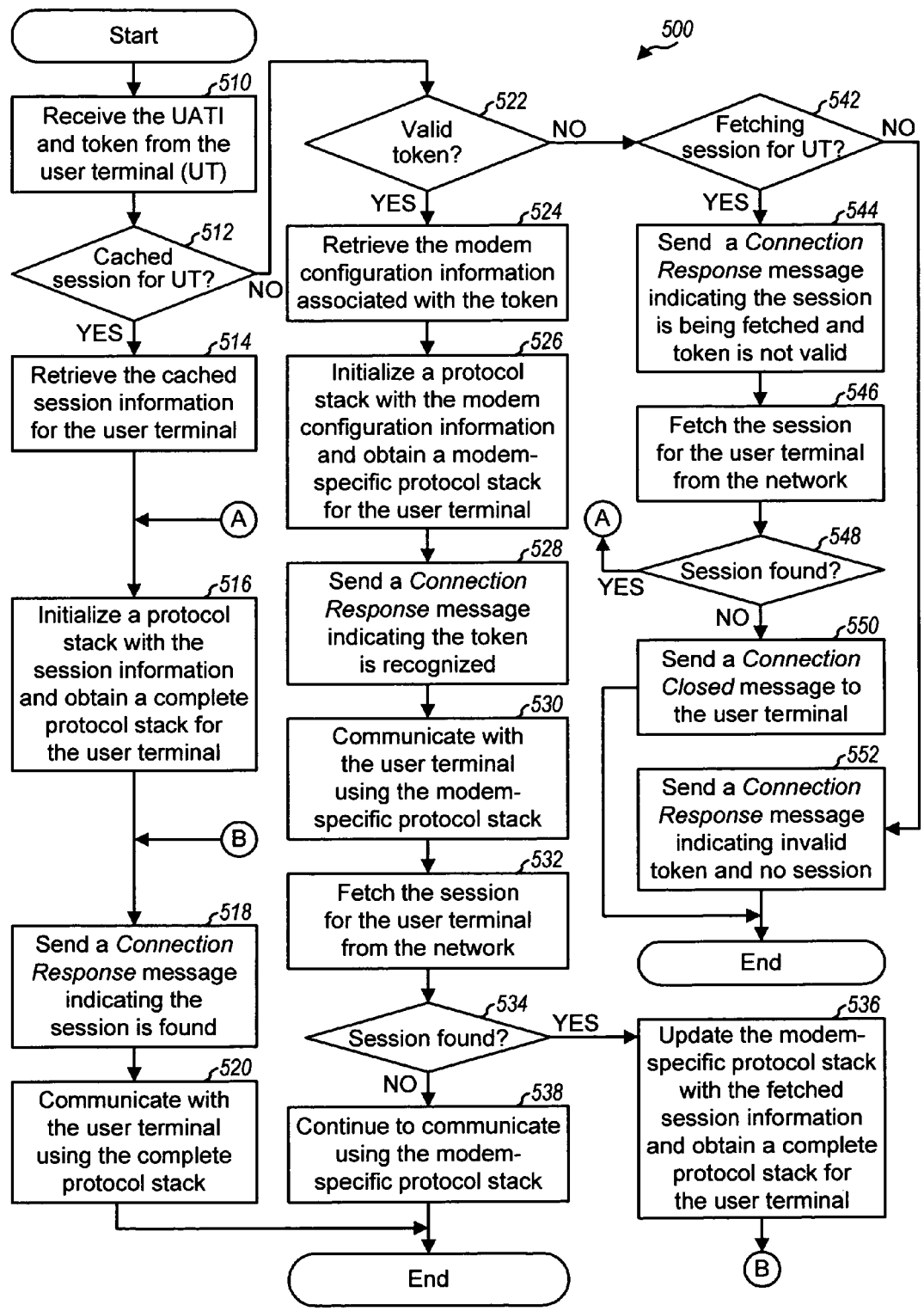
FIG. 5 shows a process performed by a target access point for communication.

FIG. 5 shows a process 500 performed by target access point 120b for communication with user terminal 110. The target access point receives the UATI and the token from the user terminal (block 510). The target access point determines whether the session for the user terminal (as indexed by the UATI) is stored/cached by the access point (block 512). If the answer is 'Yes' for block 512, then the target access point retrieves the session for the user terminal (block 514) and initializes the air interface protocol stack with the session information to obtain the complete protocol stack for the user terminal (block 516). The target access point then sends a Connection Response message indicating that the session is found (block 518). The target access point can thereafter communicate with the user terminal using the complete protocol stack, e.g., for secured or unsecured data exchanges (block 520).

If the target access point does not have a cached session for the user terminal and the answer is 'No' for block 512, then the target access point determines whether the token received from the user terminal is valid (block 522). A valid token is a token that is recognized and supported by a recipient access point. A token that is allowed by the network but not recognized or not supported by the recipient access point for any reason would be considered as an invalid token by this access point. If the answer is 'Yes' for block 522, then the target access point obtains the modem configuration information associated with the token (block 524) and initializes the air interface protocol stack with the modem configuration information to obtain the modem-specific protocol stack for the user terminal (block 526). The target access point then sends a Connection Response message indicating that the token is recognized (block 528). The target access point can thereafter communicate with the user terminal using the modem-specific protocol stack (block 530). Data may be exchanged between the target access point and the user terminal without security or with security provided by higher layers that sit above the radio link protocol stack (block 530).

The system may support two or more types of security. The security layer in the air interface protocol stack provides over-the-air security. A higher layer may provide end-to-end security. Both layers may exchange data. For example, a user terminal may exchange unencrypted signaling and encrypted data. The target access point may terminate the unencrypted signaling and may forward the encrypted data (as well as encrypted signaling) to the session-holding access point. The user terminal may also send data encrypted at a higher layer without additional over-the-air encryption, and this encrypted data may be forwarded either to the target access point or may be used for local services.

The target access point attempts to locate and fetch the session for the user terminal, e.g., via UATI lookup server 140 and session-holding access point 120a (block 532). If the session is found and fetched, as determined in block 534, then the target access point updates the modem-specific protocol stack with the user-specific session information to obtain the complete protocol stack for the user terminal (block 536). The target access point then sends another Connection Response message indicating that the session is found (block 518). The target access point can thereafter communicate with the user terminal using the complete protocol stack (block 520). Otherwise, if the session is not found as determined in block 534, then the target access point may continue to communicate with the user terminal using the modem-specific protocol stack (block 538). Alternatively, the target access point may instruct the user terminal to create a new session, since access to a session may be required for the access point to allow data services. The session fetch may take a variable amount of time. Since the target access point typically does not know whether the session for the user terminal exists, the target access point may set a timer to a predetermined value when the session fetch is initiated and may deem that the session is not found when the timer expires.

The token received from the user terminal may not be valid for various reasons. For example, this token may be (1) a token that is not allowed by the system, (2) a token that is not recognized by the target access point, or (3) a token that is recognized but not supported by the target access point (e.g., a token for a new protocol release not supported by the access point). If the token is not valid for whatever reason and the answer is 'No' for block 522, then the target access point may send a Connection Response message indicating that the token is not recognized (or recognized but not supported) by the target access point (not shown in FIG. 5). This message may invoke the user terminal to send another token. The target access point determines whether or not to locate and fetch the session for the user terminal (block 542). This decision may be made based on various factors such as the UATI, the token received from the user terminal, and so on. For example, the UATI or the token may indicate that the user terminal belongs to another network operator and is currently roaming. A parameter for an operator ID may be defined (e.g., in the token, as described below), and this parameter may be used to indicate which network operator stores the session for the user terminal. If the session is to be fetched and the answer is 'Yes' for block 542, then the target access point sends a Connection Response message indicating that the session is being fetched and the token is not recognized (block 544). The target access point then attempts to fetch the session for the user terminal from the session-holding access point (block 546). No communication between the target access point and the user terminal occurs while the session is being fetched. A determination is then made whether or not the session is found (block 548). If the session is not found (e.g., the timer expires) and the answer is 'No' for block 548, then the target access point may send to the user terminal a Connection Closed message indicating that the session was not found (block 550). The target access point may also send the Connection Closed message right after block 522 for an invalid token. The Connection Closed message forces the user terminal to establish a new session with the target access point.

If the target access point decides not to fetch the session for the user terminal and the answer is 'No' for block 542, then the target access point sends a Connection Response message indicating that the token is invalid and there is no session (block 552). This Connection Response message may invoke the user terminal to attempt to establish a connection with another token or to establish a new session with the target access point.

Figure 6:
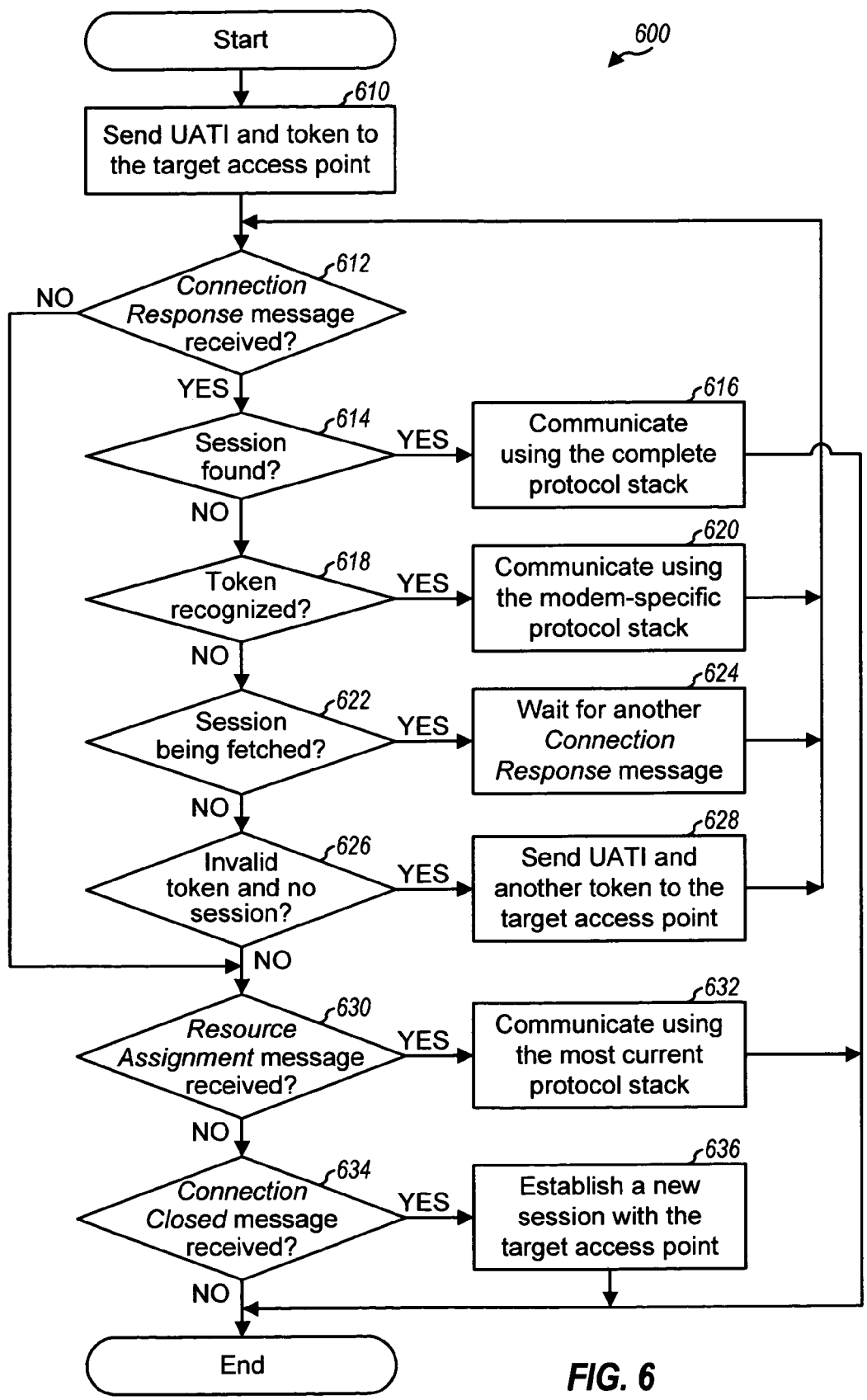
FIG. 6 shows a process performed by a user terminal for communication.

FIG. 6 shows a process 600 performed by user terminal 110 for communication with target access point 120b. The user terminal sends a Connection Request message with the UATI and token to the target access point to attempt to establish a connection (block 610). The user terminal then waits for a Connection Response message or some other message from the target access point. If the Connection Response message is received, as determined in block 612, then the user terminal examines the content of this message to ascertain the status of the connection.

If the Connection Response message indicates that the session for the user terminal is found, as determined in block 614, then the user terminal communicates with the target access point using the complete protocol stack (block 616). If the session is not found but the token is recognized by the target access point, as determined in block 618, then the user terminal communicates with the target access point using the modem-specific protocol stack (block 620). The user terminal may also communicate with the target access point using the complete protocol stack. The target access point may then store data that it cannot process without the complete protocol stack and may either (1) process this data after the session for the user terminal is fetched or (2) forward the data to the session-holding access point. If the token is not recognized and the session is being fetched, as determined in block 622, then the user terminal waits for another Connection Response message indicating the result of the fetch (block 624). The user terminal may send another Connection Request message with the UATI and the same token if another Connection Response message is not received within a predetermined time period. If the token is not recognized and the session is not being fetched, as determined in block 626, then the user terminal may send another Connection Request message with the UATI and another token (block 628). From blocks 620, 624 and 628, the user terminal returns to block 612 and remains alert for another message from the target access point.

The user terminal may receive a message other than a Connection Response message in response to the Connection Request message. For example, the user terminal may receive a Resource Assignment message assigning the user terminal with resources on the forward link and/or reverse link (block 630). In this case, the user terminal assumes that it has received a Connection Response message from the target access point. The user terminal then communicates with the target access point using (1) the most recently configured protocol stack, if the user terminal has previously communicated with this access point, or (2) the modem-specific protocol stack, if the user terminal has not previously communicated with this access point (block 632). The use of the Resource Assignment message is useful to quickly transition between the active and dormant states and avoids intermediate signaling for the Connection Response message. In general, any message that would not be sent unless the session was found may be used to indicate the session for the user terminal was found.

If the user terminal receives a Connection Closed message, as determined in block 634, then the user terminal may attempt to establish a new session with the target access point (block 636). The process terminates after blocks 616, 632 and 636.

FIGS. 5 and 6 represent specific embodiments of the processing by the target access point and the user terminal for communication. The processing by the target access point and the user terminal may also be performed in numerous other manners. In general, the processing by the user terminal is complementary to the processing by the target access point.

Figure 7A:
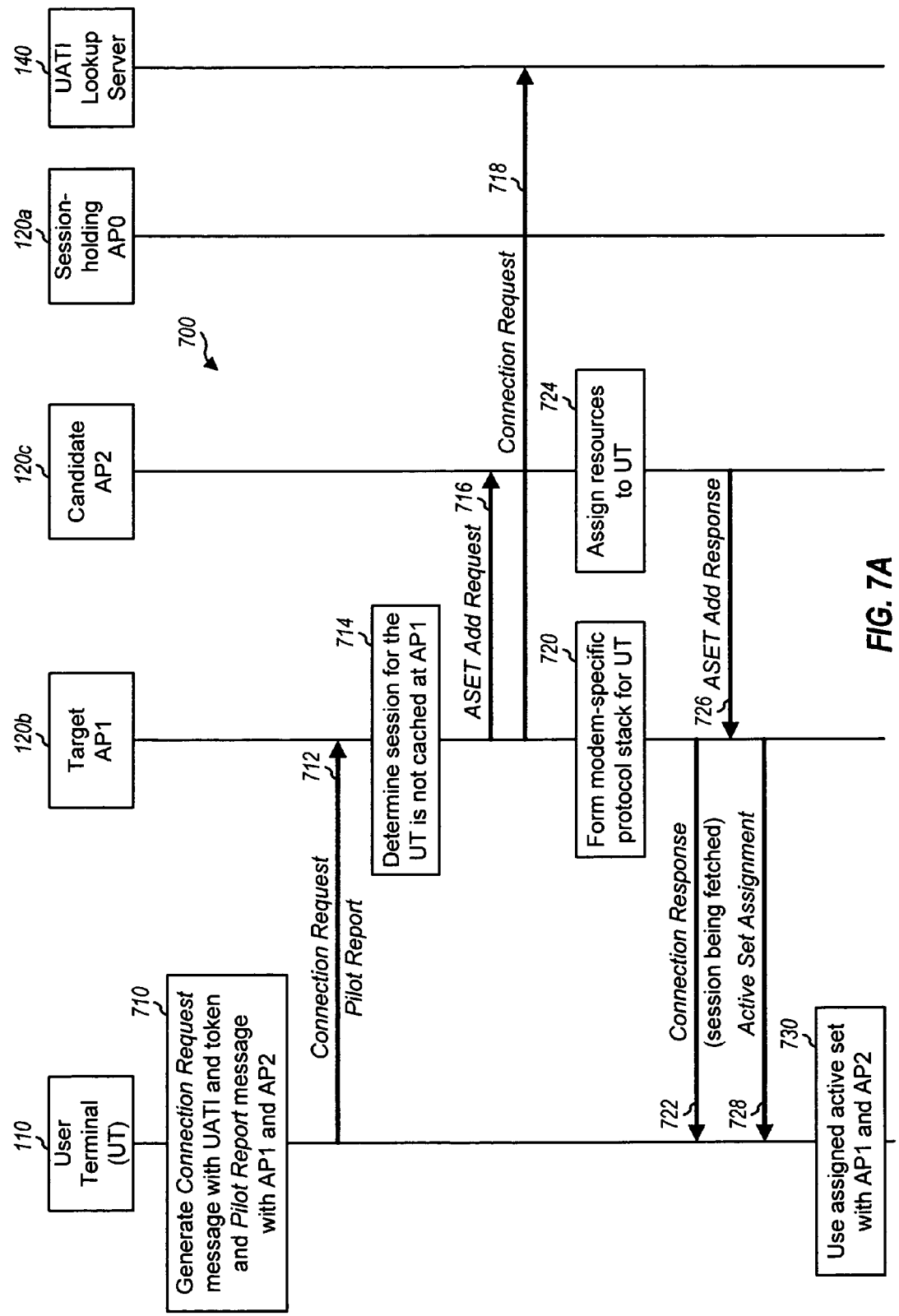
FIGS. 7A and 7B show a flow for establishing a connection for the user terminal.
Figure 7B:
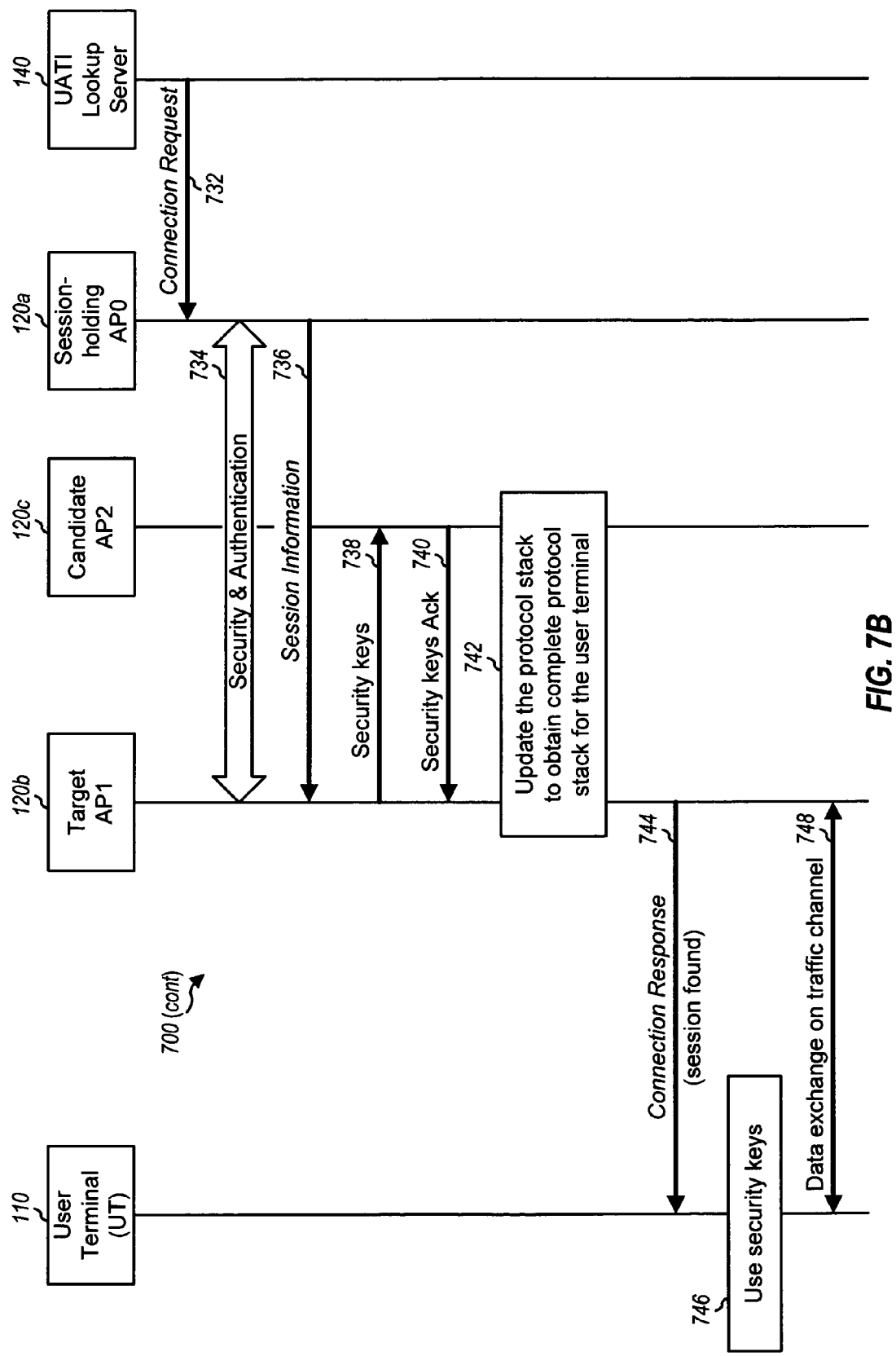

FIGS. 7A and 7B show a call flow 700 for establishing a connection for user terminal 110 (UT) via target access point 120b (AP1) when the session for the user terminal is not cached at the target access point. In FIG. 7A, the user terminal generates a Connection Request message with the UATI and token (step 710). The user terminal may also generate a Pilot Report message containing pilot strength measurements for all access points that are received by the user terminal with sufficient strength. In this example, the pilot report indicates that access point 120b (AP1) and access point 120c (AP2) are received with sufficient strength by the user terminal. The user terminal sends the Connection Request message and the Pilot Report message to AP1 (step 712). The Connection Request message requests a radio data path for the user terminal.

AP1 receives the Connection Request message from the user terminal, extracts the UATI, and determines that it does not have cached session information for the user terminal (step 714). AP1 also receives the Pilot Report message, determines that AP2 is included in the pilot report, and sends an Active Set (ASET) Add Request message to AP2 to ask whether AP2 can be added to the active set of the user terminal (step 716). AP1 also forwards the Connection Request message to UATI lookup server 140 using this server's address, which is preconfigured at AP1 (step 718). AP1 initializes the air interface protocol stack with the modem configuration information associated with the token sent in the Connection Request message (block 720). AP1 then sends to the user terminal a Connection Response message indicating that the token is recognized and the session is being fetched (step 722).

AP2 receives the ASET Add Request message from AP1, assigns resources to the user terminal (step 724), and sends back an ASET Add Response message to AP1 (step 726). AP1 receives the ASET Add Response message, determines that AP2 has allocated resources for the user terminal, and sends an Active Set Assignment message containing AP1 and AP2 to the user terminal (step 728). The user terminal receives the Active Set Assignment message and uses the assigned active set with AP1 and AP2 (step 730).

In FIG. 7B, UATI lookup server 140 receives the Connection Request message from AP1, extracts the UATI for the user terminal, determines the session-holding access point (AP0) for the user terminal based on the UATI, and forwards the Connection Request message to AP0 (step 732). AP0 and AP1 then perform security and authentication, if necessary, based on a procedure specified by the network (step 734). Upon completion of this procedure, AP0 sends to AP1 a Session Information message containing the session information for the user terminal (e.g., the security keys and protocols previously negotiated between the user terminal and AP0) (step 736). AP1 receives the Session Information message from AP0 and extracts the user-specific session information. AP1 then sends the security keys to AP2, which is in the active set (step 738), and AP2 responds with an acknowledgment (step 740). AP1 and AP2 then updates the modem-specific protocol stack with the user-specific protocol stack to obtain a complete protocol stack for the user terminal (step 742).

AP1 then sends to the user terminal another Connection Response message indicating that the session is found (step 744). The user terminal can thereafter use the security keys available for the complete protocol stack (step 746). The user terminal and AP1 can thereafter exchange secured or unsecured data on a traffic channel (step 748). During the time period from block 710 to block 746, the user terminal may send messages needed for radio link stability (or other pertinent functions) unencrypted so that AP1 can receive and process these messages. For instance, a handoff of the user terminal from AP1 to AP2 can occur, if needed, without having the session information at AP1 and AP2. As noted above, the user terminal may use security and send secured data during the time period from block 710 to block 746. AP1 may store or forward the secured data during this time period and is able to decrypt the secured data after block 742.

FIGS. 7A and 7B show a specific call flow for establishing a connection for the user terminal. The signaling may also be sent in other manners different from that shown in FIGS. 7A and 7B. For example, AP0 may communicate with AP1 and AP2 simultaneously and may directly provide the session to both AP1 and AP2.

Figure 8:
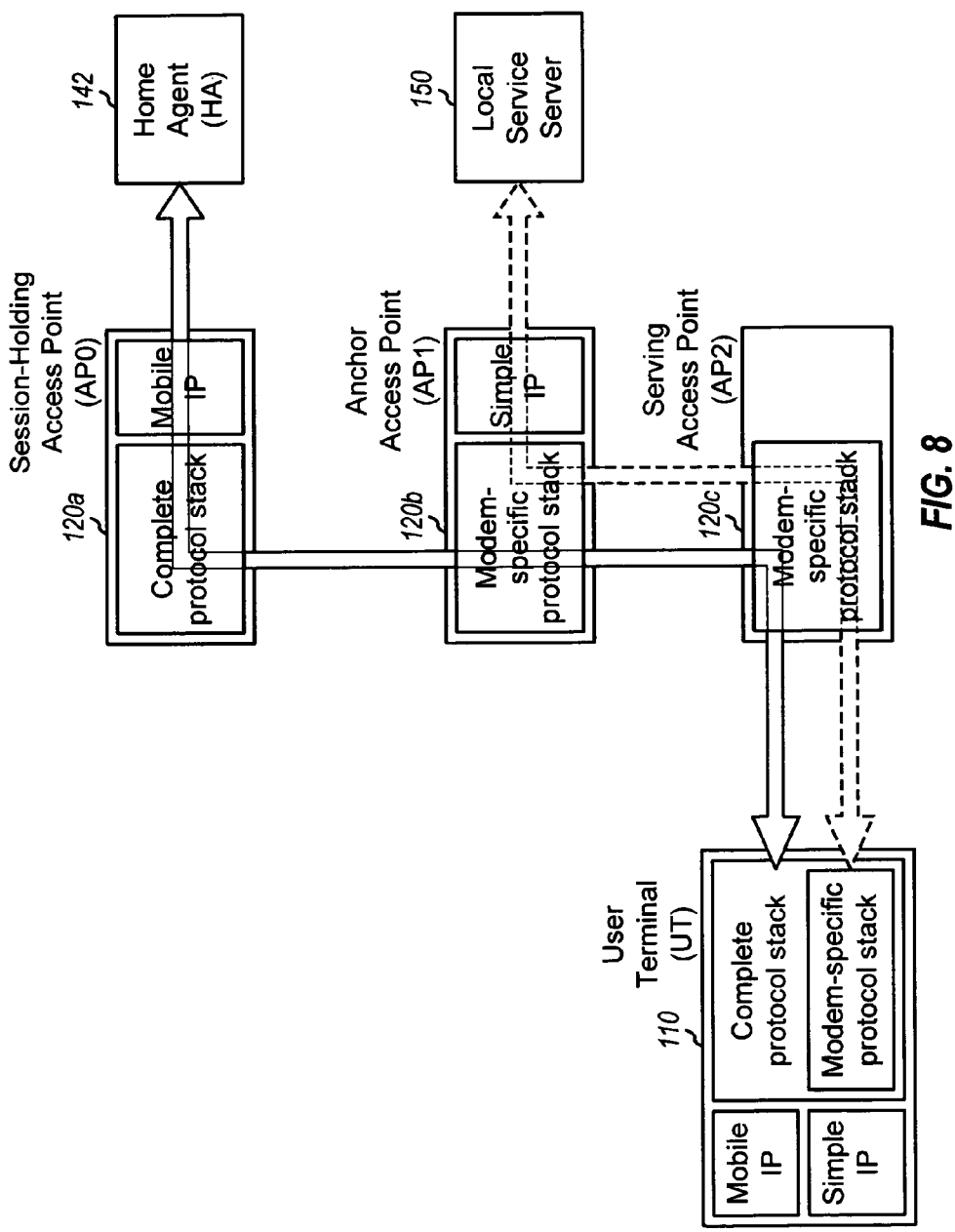
FIG. 8 shows communication between the user terminal and the access points.

FIG. 8 shows a diagram of the communication between user terminal 110 and access points 120a (AP0), 120b (AP1), and 120c (AP2). AP0 holds the session for the user terminal but typically does not control the connection. The control for the connection may be distributed. For some networks, AP0 may control the connection, e.g., only certain messages such as such as messages to close a connection, switch to another mode, and so on may originate from AP0. AP0 also functions as a mobile IP node for the user terminal and acts as a proxy for the mobile or permanent IP address assigned to the user terminal. AP0 receives incoming packets sent by other hosts and servers to the user terminal's IP address and forwards these packets to the user terminal. AP0 also receives outgoing packets from the user terminal and sends these packets to the recipient hosts with the user terminal's IP address as the source address. Home agent 142 provides data connectivity for packet exchanges with external hosts and servers. The user terminal and AP0 communicate using the complete protocol stack for the user terminal.

AP1 controls the connection for the user terminal (e.g., manages the active set) and is the anchor access point for the connection. AP2 is a member of the active set and is the current serving access point for the user terminal. The user terminal may communicate with AP1 and/or AP2 at any given moment and may quickly switch between these two access points. Both AP1 and AP2 communicate with the user terminal using the modem-specific protocol stack for the user terminal.

As shown in FIG. 8, the user terminal may obtain local services via AP1. For example, the user terminal may send packets using simple IP via AP1 to local service server 150, which may be, for example, an Internet server, a push-to-talk server, an emergency call 911 server, a media billing server, and so on. The local services may be unsecured services or may use higher layer security (e.g., IPSec or some other protocol). AP1 can provide the local services even though the session for the user terminal has not been fetched or transferred from AP0.

Figure 9:
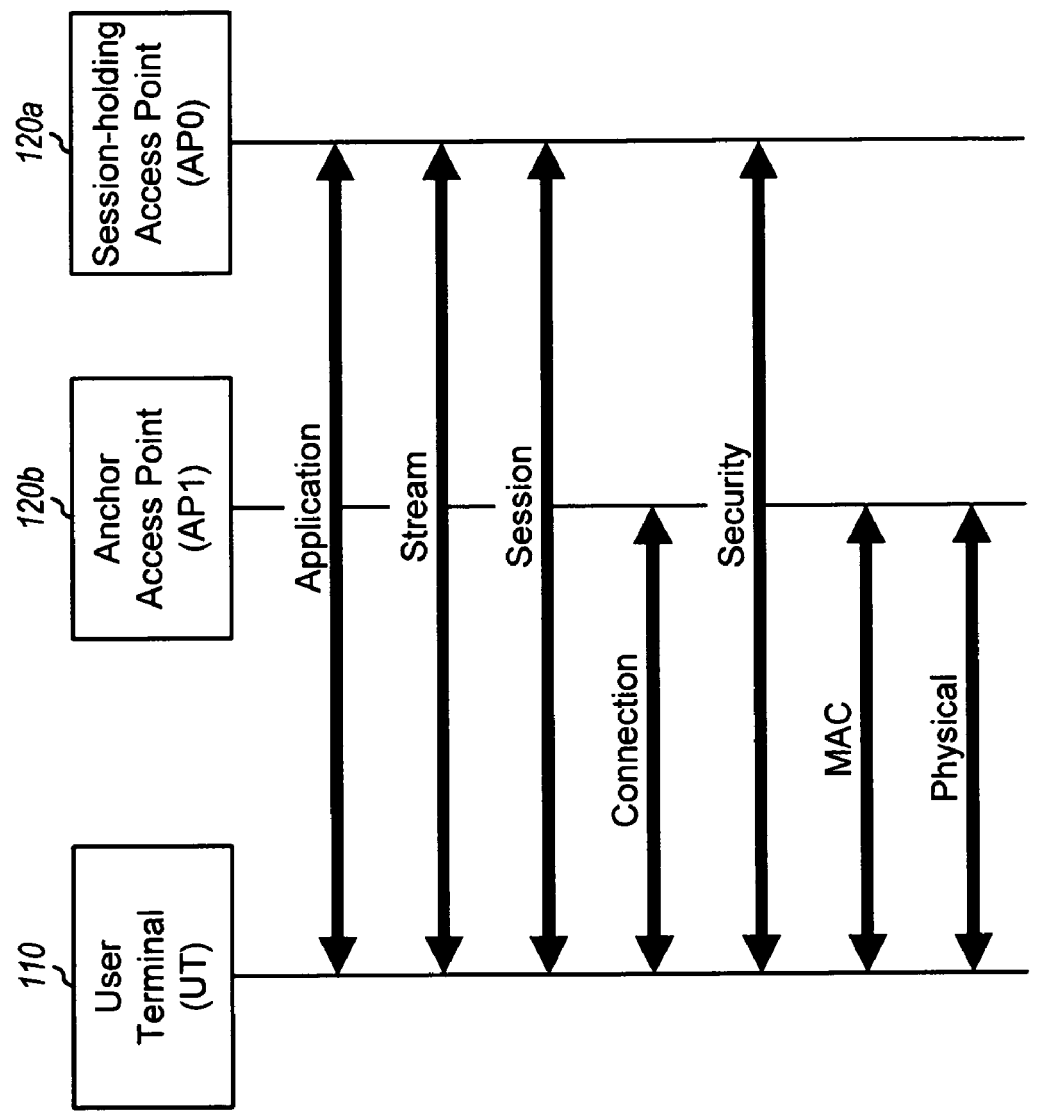
FIG. 9 shows the air interface protocol stack for the communication in FIG. 8.

FIG. 9 shows the air interface protocol stack for the communication between the user terminal and the anchor access point (AP1) and the session-holding access point (AP0) for the case in which AP1 recognizes the token sent by the user terminal but does not have the session. FIG. 9 shows the end points for each layer for a specific embodiment and applies to the heavy solid arrow in FIG. 8. In general, the peer-to-peer communication for each layer is dependent on various factors such as the design and configuration of the protocols. A given function may be performed by both AP0 and AP1 and a given layer may terminate at both access points. In any case, at the MAC and physical layers, the modem-specific protocol stack is sufficient to give AP1 all of the pertinent information needed for communication with the user terminal. The MAC and physical layers can thus operate in the same manner as if AP1 had the session for the user terminal.

At the security layer, AP1 does not have the security keys and is thus unable to decrypt packets or check authentication header. The user terminal and AP1 are not able to use security protocols before AP1 obtains the security keys. If the user terminal sends packets with security enabled, then the packets may be buffered at AP1 until the session is fetched or immediately forwarded to AP0. Security may be enabled based on a security bit in each packet or may be indicated by the token. These packets may use authentication by adding an explicit authentication header that is checked at AP1. All signaling messages between the user terminal and AP1 are sent with security disabled.

The session, stream, and application layers are at AP0. AP1 forwards all streams, except for the signaling and local service streams, to AP0. At the application layer, the signaling application runs at AP1 and its parameters are specified by the token.

The Connection Request message sent by the user terminal to the target access point may convey various types of information that are useful for establishing a connection. This message may have various formats. Table 2 shows an exemplary format for the Connection Request message.

TABLE 2

Connection Request message

| Field | Size (in bits) | Definition |
| --- | --- | --- |
| Address_Included | 1 | Indicates whether an address is included in the message. |
| Address_Type | 2 | '00' - Indicates a full 128-bit UATI is being sent.<br>'01' - Indicates a short 32-bit ATI is being sent.<br>'10' - Reserved value.<br>'11' - Indicates a new session or no address available. |
| Address_Record | 0, 32, or 128 | Carries the 128-bit UATI or 32-bit ATI for the user terminal if Address_Type = '00' or '01', respectively. |
| Token_Included | 1 | Indicates whether a token is included in the message. |
| Token | 16 | Carries a 16-bit token for the modem configuration information for the user terminal. |

The Connection Request message typically includes the UATI when the user terminal is establishing a connection with the target access point. The Connection Request message may include the ATI if there is no ambiguity in the address for the user terminal. This may be the case, for example, if the user terminal has previously established a connection with the target access point and is now transitioning between the idle and connected states for communicating with the same access point. The Connection Request message may also omit the token if there is no ambiguity (e.g., for the quick transition described above). When a token is not provided in the Connection Request message, the target access point may assume that the token used for the previous connection attempt is being used again.

Table 2 indicates that the modem configuration information for the user terminal may be efficiently conveyed using a single token. The Connection Request message may have fewer, more and/or different fields. For example, the Connection Request message may include a 1-bit field that indicates whether additional fields are included in the message. The additional fields may carry other session information that is not conveyed by the token (e.g., security keys).

The Connection Request message may be sent, for example, in a MAC header for a MAC protocol data unit (PDU) sent by the user terminal to the target access point. The Connection Request message may be a message that is included in a packet containing other messages or data, e.g., the Pilot Report message described above for FIG. 7A. The Connection Request message is defined by all protocol revisions supported by the network and is recognized by all access points in the network.

The Connection Response message sent by the target access point to the user terminal may convey various types of information that are useful for ascertaining the state of the connection. This message may also have various formats. Table 3 shows an exemplary format for the Connection Response message.

TABLE 3

Connection Response message

| Field | Size (in bits) | Definition |
| --- | --- | --- |
| MAC ID | 8 | Carries a MAC identifier (MAC ID) assigned to the user terminal for use during the connection to identify the user terminal. |
| Token_Recognized | 1 | '0' - Indicates the token sent by the user terminal is recognized by the access point.<br>'1' - Indicates the token is not recognized. |
| Session_Found | 1 | '0' - Indicates the session for the user terminal is found.<br>'1' - Indicates the session is not found. |
| Wait_for_Session | 1 | '0' - Indicates the session is being fetched.<br>'1' - Indicates the session is not being fetched or is not available. |

The Connection Response message may have fewer, more and/or different fields. For example, the Connection Response message may include a 1-bit field that indicates whether additional fields are included in the message. The additional fields may carry, e.g., request for certain user-specific session information that is not conveyed by the token (e.g., security keys, paging information, and so on).

As shown in FIGS. 6 and 7, the target access point may send one or multiple Connection Response messages to the user terminal for connection setup. The Token_Recognized, Session_Found, and Wait_for_Session bits in each Connection Response message are set based on the information available at the target access point for the user terminal.

In the description above and illustrated in Table 1, the token conveys all modem configuration information with a single token value. A token may also be defined with multiple fields. Each field may be considered as a sub-token, and each sub-token may convey certain information useful for communication. For example, each sub-token may convey (1) parameter values for a different layer, (2) information for a set of protocols, or (3) other pertinent information (e.g., a network operator ID).

The sub-tokens may be used in various manners. For example, a set of protocols across all the layers for system access may be described by the first N bits of the token, and the rest of the protocols may be described by the remaining bits of the token. In this way, access may be allowed but no data services.

Figure 10:
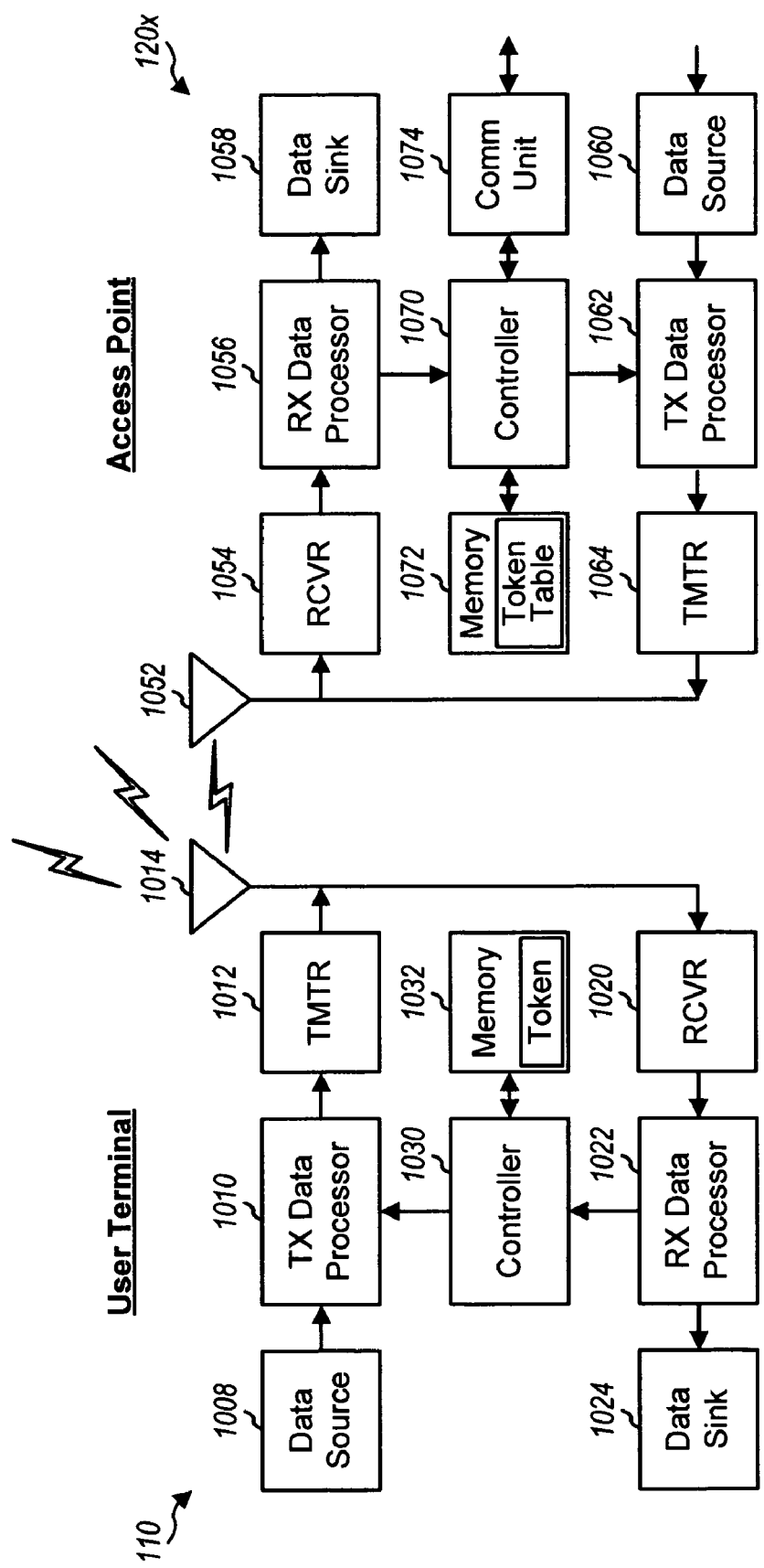
FIG. 10 shows a block diagram of the user terminal and the access point.

FIG. 10 shows a block diagram of user terminal 110 and an access point 120x, which may be any access point in network 100 in FIG. 1. For the reverse link, at user terminal 110, a transmit (TX) data processor 1010 receives traffic data from a data source 1008 and signaling (e.g., a Connection Request message) from a controller 1030, processes (e.g., formats, encodes, interleaves, and modulates) the traffic data and signaling, and generates modulation symbols. A transmitter unit (TMTR) 1012 performs processing specified by the network and generates data chips. For example, transmitter unit 1012 may perform OFDM modulation for an OFDMA system, spectral spreading for a CDMA system, and so on. Transmitter unit 1012 further conditions (e.g., converts to analog, filters, amplifies, and frequency upconverts) the data chips to generate a modulated signal, which is transmitted from an antenna 1014.

At access point 120x, the modulated signal transmitted by user terminal 110 is received by an antenna 1052. A receiver unit (RCVR) 1054 processes (e.g., conditions and digitizes) the received signal from antenna 1052, performs processing complementary to the processing by transmitter unit 1012, and provides received symbols. A receive (RX) data processor 1056 processes (e.g., demodulates, deinterleaves, and decodes) the received symbols, provides decoded traffic data for terminal 110 to a data sink 1058, and provides the received signaling to a controller 1070.

For the forward link, at access point 120x, a TX data processor 1062 receives traffic data for user terminal 110 as well as other user terminals from a data source 1060 and signaling (e.g., a Connection Response message) from controller 1070. TX data processor 1062 processes the traffic data and signaling and generates modulation symbols. A transmitter unit 1064 processes the modulation symbols, performs signal conditioning, and provides a modulated signal, which is transmitted from antenna 1052. At user terminal 110, the modulated signals transmitted by access point 120x and other access points are received by antenna 1014, conditioned and digitized by a receiver unit 1020, and processed by an RX data processor 1022. RX data processor 1022 provides decoded traffic data for user terminal 110 to a data sink 1024 and provides recovered signaling for user terminal 110 to controller 1030.

Controllers 1030 and 1070 direct operation at user terminal 110 and access point 120x, respectively. Memory units 1032 and 1072 store program codes and data used by controllers 1030 and 1070, respectively. Memory unit 1032 may also store the session information and the token for user terminal 110. Memory unit 1072 may also store the session information or the modem configuration information for user terminal 110, a token table, and so on. Controller 1030 establishes and manages the connection and session for user terminal 110 and may implement part of process 400 in FIG. 4, process 600 in FIG. 6, and process 700 in FIGS. 7A and 7B. Controller 1070 manages the connection and possibly the session for user terminal 110 and may implement part of process 400 in FIG. 4, process 500 in FIG. 5, and process 700 in FIGS. 7A and 7B.

The connection setup techniques described herein achieve the following goals:

1. Radio Link Stability. A stable radio connection between the user terminal and the network can be established during the time that the network is locating the session for the user terminal. Handoff between access points can also be achieved for the user terminal before the session for the user terminal is found.
2. Local Service Provision. The anchor access point is able to provide local services for the user terminal without the session or even if a session does not exist.
3. Data Services. The user terminal is able to send secured or unsecured data to the session-holding access point before the session is found or if the session is not transferred to the anchor access point.

The connection setup techniques also provide other benefits and advantages. First, the techniques provide flexibility for connection setup. The network operator can determine what combinations of protocol versions and parameter values are useful, classify those as preconfigured modem-specific configurations, and assign tokens to these configurations. The network operator can easily define new modem-specific configurations and update the token table. The access points can readily obtain the token table via a backbone network. Second, the techniques allow for efficient connection setup. A preconfigured modem-specific configuration and its assigned token may be communicated to the user terminal at the start of the session. The user terminal may use this modem-specific configuration for an extended period of time (e.g., several days). The user terminal may send just the token to a new target access point to establish a connection in order to communicate with the access point. This connection setup is fast since (1) the user terminal does not need to send a long list of parameter values to the target access point and (2) the target access point does not need to fetch the session for the user terminal from the session-holding access point.

The connection setup techniques described herein may be used for various wireless and wireline multiple-access communication systems. For example, these techniques may be used for an Orthogonal Frequency Division Multiple Access (OFDMA) system, a Time Division Multiple Access (TDMA) system, a Frequency Division Multiple Access (FDMA) system, a Code Division Multiple Access (CDMA) system, and so on.

The connection setup techniques described herein may be implemented by various means. For example, these techniques may be implemented in hardware, software, or a combination thereof. For a hardware implementation, the processing units used to perform connection setup at a user terminal (e.g., each of the processing units show in FIG. 10, or a combination of processing units) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used to perform connection setup at an access point may also be implemented within one or more ASICs, DSPs, processors, electronic devices, and so on.

For a software implementation, the connection setup techniques may be implemented with modules (e.g., procedures, functions, and so on) that perform the functions described herein. The software codes may be stored in a memory unit (e.g., memory unit 1032 or 1072 in FIG. 10) and executed by a processor (e.g., controller 1030 or 1070). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus in a communication network, comprising:
   a controller operative to receive a first message sent by a user terminal to establish a connection, to extract a token included in the first message, to obtain modem configuration information associated with the token, and to send to the user terminal a second message indicating successful connection setup based on the token,
   wherein the token is one of a plurality of tokens each of which is an N-bit value representing one of a plurality of specific modem configurations allowed for use in a communication network, wherein the token and the modem configuration are associated with session information from a session previously established for the user terminal, the session information including information for protocols and parameter values to be used for communications and being partitioned into at least two portions;
   wherein the modem configuration comprises a first partitioned portion of the session information that includes at least one parameter value used to configure radio connectivity; and
   at least one data processor operative to exchange data with the user terminal in accordance with the modem configuration information.

2. The apparatus of claim 1, wherein the controller is operative to form a protocol stack for the user terminal with the modem configuration information, and wherein the at least one data processor is operative to exchange data with the user terminal in accordance with the protocol stack.

3. The apparatus of claim 2, wherein the controller is operative to determine whether the session for the user terminal is available in local memory, and wherein the at least one data processor is operative to update the protocol stack according to user-specific session information from the session to form a complete protocol stack and exchange data with the user terminal in accordance with the session for the user terminal if the session is available.

4. The apparatus of claim 2, wherein the controller is operative to initiate a fetch of the session for the user terminal from the network, and wherein the at least one data processor is operative to update the protocol stack according to user-specific session information from the session to form a complete protocol stack and exchange data with the user terminal in accordance with the session for the user terminal if the session is fetched.

5. The apparatus of claim 1, wherein the controller is further operative to determine whether the token is valid and, if the token is valid, to obtain the modem configuration information and to send the second message.

6. The apparatus of claim 5, wherein the controller is operative to look up the token in a token table containing tokens allowed for the network and to indicate that the token is valid if found in the token table.

7. The apparatus of claim 1, wherein the session information further comprises a second partitioned portion comprising user-specific session information for the user terminal, wherein the user-specific session information is not necessary for establishing a radio connection.

8. The apparatus of claim 7, wherein the user-specific session information comprises a security key, and wherein the at least one data processor is operable to exchange data securely using the security key if the session is fetched from the network or available in local memory.

9. The apparatus of claim 1, wherein the token includes a plurality of parameter values for radio communication.

10. The apparatus of claim 1, wherein the token is selected from among a plurality of tokens available for the user terminal.

11. The apparatus of claim 1, wherein the first message comprises a connection request message having a field indicating whether or not any token is included in the connection request message.

12. A method of communicating in a communication network, comprising:
    receiving a first message sent by a user terminal to establish a connection;
    obtaining from the first message a token indicative of modem configuration information to be used for the connection, wherein the token is one of a plurality of tokens each of which is an N-bit value representing one of a plurality of specific modem configurations allowed for use in a communication network, wherein the token and the modem configuration are associated with session information from a session previously established for the user terminal, the session information including information for protocols and parameter values to be used for communications and being partitioned into at least two portions, wherein the modem configuration comprises a first partitioned portion of the session information that includes a plurality of parameter values for radio connectivity;
    obtaining the modem configuration information associated with the token;
    sending to the user terminal a second message indicating successful connection setup based on the token; and
    exchanging data with the user terminal in accordance with the modem configuration information.

13. The method of claim 12, further comprising:
    determining whether the token is valid; and
    if the token is valid, performing the obtaining the modem configuration information, the sending to the user terminal the second message, and the exchanging data with the user terminal.

14. The method of claim 13, further comprising:
    if the token is not valid and the session for the user terminal is not found, sending to the user terminal a message indicating the connection is closed.

15. The method of claim 13, further comprising:
    if the token is recognized but not supported, sending to the user terminal a message indicating the token is recognized but not supported.

16. The method of claim 12, further comprising:
    determining whether a session for the user terminal is available in local memory; and if the session is available, exchanging data with the user terminal in accordance with the session for the user terminal.

17. The method of claim 12, further comprising:
fetching a session for the user terminal from the network; and
if the session is fetched, exchanging data with the user terminal in accordance with the session for the user terminal.

18. The method of claim 12, wherein the token is selected from among the plurality of tokens available for the user terminal.

19. The method of claim 12, wherein the first message comprises a connection request message having a field indicating whether or not any token is included in the connection request message.

20. The method of claim 12, wherein the token includes a plurality of parameter values for radio communication.

21. An apparatus in a communication network, comprising:
means for receiving a first message sent by a user terminal to establish a connection;
means for obtaining from the first message a token indicative of modem configuration information to be used for the connection, wherein the token is one of a plurality of tokens each of which is an N-bit value representing one of a plurality of specific modem configurations allowed for use in a communication network, wherein the token and the modem configuration are associated with session information from a session previously established for the user terminal, the session information including information for protocols and parameter values to be used for communications and being portioned into at least two portions, wherein the modem configuration comprises a first partitioned portion of the session information that includes a plurality of parameter values for radio connectivity;
means for obtaining the modem configuration information associated with the token;
means for sending to the user terminal a second message indicating successful connection setup based on the token; and
means for exchanging data with the user terminal in accordance with the modem configuration information.

22. An apparatus in a communication network, comprising:
a controller operative to send a first message to a first access point to establish a connection and to receive from the first access point a second message indicating successful connection setup, wherein the first message includes a token indicative of modem configuration information to be used for the connection, wherein the token is one of a plurality of tokens each of which is an N-bit value representing one of a plurality of specific modem configurations allowed for use in a communication network, wherein the token and the modem configuration are associated with session information from a session previously established for the user terminal, the session information including information for protocols and parameter values to be used for communications and being partitioned into at least two portions, wherein the modem configuration comprises a first partitioned portion of the session information that includes a plurality of parameter values for radio connectivity, and wherein the connection setup is based on the token; and
at least one data processor operative to exchange data with the first access point in accordance with the modem configuration information.

23. The apparatus of claim 22, wherein the token is selected from among the plurality of tokens available for the apparatus, each of the plurality of tokens being associated with specific modem configuration information.

24. The apparatus of claim 22, wherein the controller is further operative to establish the session with a second access point and to obtain from the second access point the token associated with the modem configuration information, wherein the session information further comprises a second partitioned portion comprising user-specific session information not necessary for establishing a radio connection.

25. The apparatus of claim 24, wherein the controller is operative to receive from the first access point a third message indicating the session including the user-specific session information for the user terminal has been fetched, and wherein the at least one data processor is operative to exchange data with the first access point in accordance with the session.

26. The apparatus of claim 22, wherein the first message comprises a connection request message having a field indicating whether or not any token is included in the connection request message.

27. The apparatus of claim 22, wherein the token includes a plurality of parameter values for radio communication.

28. A method of communicating in a communication network, comprising:
sending from a user terminal a first message to a first access point to establish a connection, the first message including a token indicative of modem configuration information to be used for the connection, wherein the token is one of a plurality of tokens each of which is an N-bit value representing one of a plurality of specific modem configurations allowed for use in a communication network, wherein the token and the modem configuration are associated with session information from a session previously established for the user terminal, the session information including information for protocols and parameter values to be used for communications and being partitioned into at least two portions, wherein the modem configuration comprises a first partitioned portion of the session information that includes a plurality of parameter values for radio connectivity;
receiving from the first access point a second message indicating successful connection setup based on the token; and
exchanging data with the first access point in accordance with the modem configuration information.

29. The method of claim 28, further comprising:
establishing the session with a second access point, the session information further comprising a second partitioned portion comprising and user-specific session information not necessary for establishing a radio connection; and
obtaining from the second access point at least one token, each token being associated with specific modem configuration information, and wherein the token included in the first message is one of the at least one token.

30. The method of claim 28, wherein the token is selected from among the plurality of tokens available for the user terminal.

31. The method of claim 28, wherein the first message comprises a connection request message having a field indicating whether or not any token is included in the connection request message.

32. The method of claim 28, wherein the token includes a plurality of parameter values for radio communication.

33. An apparatus in a communication network, comprising:

means for sending from a user terminal a first message to a first access point to establish a connection, the first message including a token indicative of modem configuration information to be used for the connection, wherein the token is one of a plurality of tokens each of which is an N-bit value representing one of a plurality of specific modem configurations allowed for use in a communication network, wherein the token and the modem configuration are associated with session information from a session previously established for the user terminal, the session information including information for protocols and parameter values to be used for communications and being partitioned into at least two portions, wherein the modem configuration comprises a first partitioned portion of the session information that includes a plurality of parameter values for radio connectivity;

means for receiving from the first access point a second message indicating successful connection setup based on the token; and means for exchanging data with the first access point in accordance with the modem configuration information.

34. At least one processor for communicating in a communication network, comprising:

a first processing unit operable to receive a first message sent by a user terminal to establish a connection;

a second processing unit operable to obtain from the first message a token indicative of modem configuration information to be used for the connection, wherein the token is one of a plurality of tokens each of which is an N-bit value representing one of a plurality of specific modem configurations allowed for use in a communication network, wherein the token and the modem configuration are associated with session information from a session previously established for the user terminal, the session information including information for protocols and parameter values to be used for communications and being partitioned into at least two portions, wherein the modem configuration comprises a first partitioned portion of the session information that includes a plurality of parameter values for radio connectivity;

a third processing unit operable to obtain the modem configuration information associated with the token;

a fourth processing unit operable to send to the user terminal a second message indicating successful connection setup based on the token; and a fifth processing unit operable to enable exchange of data with the user terminal in accordance with the modem configuration information.

35. At least one processor for communicating in a communication network, comprising:

a first processing unit operable to send from a user terminal a first message to a first access point to establish a connection, the first message including a token indicative of modem configuration information to be used for the connection, wherein the token is one of a plurality of tokens each of which is an N-bit value representing one of a plurality of specific modem configurations allowed for use in a communication network, wherein the token and the modem configuration are associated with session information from a session previously established for the user terminal, the session information including information for protocols and parameter values to be used for communications and being partitioned into at least two portions, wherein the modem configuration comprises a first partitioned portion of the session information that includes a plurality of parameter values for radio connectivity;

a second processing unit operable to receive from the first access point a second message indicating successful connection setup based on the token; and a third processing unit operable to exchange data with the first access point in accordance with the modem configuration information.

* * * * *